No. 12,578. REISSUED DEC. 18, 1906.

F. A. BORST & J. GROSCOP.

MACHINE FOR MANUFACTURING HOLLOW CONCRETE BUILDING BLOCKS.

APPLICATION FILED MAR. 29, 1905.

2 SHEETS—SHEET 1.

Witnesses:
Alfred C. Marks
[illegible]

Frank A. Borst, Inventors.
By their Attorney & John Groscop.
Edward N. Pagelsen.

No. 12,578.

REISSUED DEC. 18, 1906.

F. A. BORST & J. GROSCOP.

MACHINE FOR MANUFACTURING HOLLOW CONCRETE BUILDING BLOCKS.

APPLICATION FILED MAR. 29, 1905.

2 SHEETS—SHEET 2.

Witnesses:
Alfred L. Marks
Peter Lott

Frank A. Borst, Inventors
& John Groscop.

By their Attorney
Edward N. Pageler.

UNITED STATES PATENT OFFICE.

FRANK A. BORST, OF SOUTH BEND, AND JOHN GROSCOP, OF AUBURN, INDIANA, ASSIGNORS, BY DIRECT AND MESNE ASSIGNMENTS, TO IDEAL CONCRETE MACHINERY COMPANY, OF SOUTH BEND, INDIANA, A CORPORATION OF INDIANA.

MACHINE FOR MANUFACTURING HOLLOW CONCRETE BUILDING-BLOCKS.

No. 12,578. Specification of Reissued Letters Patent. Reissued Dec. 18, 1906.

Original No. 735,938, dated August 11, 1903. Application for reissue filed March 29, 1905. Serial No. 252,755.

*To all whom it may concern:*

Be it known that we, FRANK A. BORST, residing at South Bend, in the county of St. Joseph, and JOHN GROSCOP, residing at Auburn, in the county of Dekalb, State of Indiana, citizens of the United States, have invented certain new and useful Improvements in Machines for Manufacturing Hollow Concrete Building-Blocks; and we do hereby declare that the following is a full, clear, and exact description of the invention, which will enable others skilled in the art to which it appertains to make and use the same, reference being had to the accompanying drawings, which form part of this specification.

Our invention relates to improvements in machines for manufacturing hollow concrete building-blocks.

The principal object of our invention is to provide a cheap, simple, and efficient machine for molding hollow concrete building-blocks so constructed and arranged that the design or configuration of the front face or either end can readily and conveniently be changed or modified at pleasure by the substitution of a single plate.

Our invention consists of a pivotally-mounted mold formed of hinged sections, a pair of horizontally-movable cores or plungers for forming the hollow interior of the blocks, an upright supporting-frame on which the molds and movable cores are mounted, and means for moving said cores into and out of the mold.

The principal novel feature of our invention resides in the construction of the mold and the arrangement of the movable cores by which the blocks are formed with their face downward, and the configuration thereof can be conveniently changed at pleasure.

Similar reference-numerals in the accompanying drawings indicate like parts throughout the several views, in which—

Figure 1:
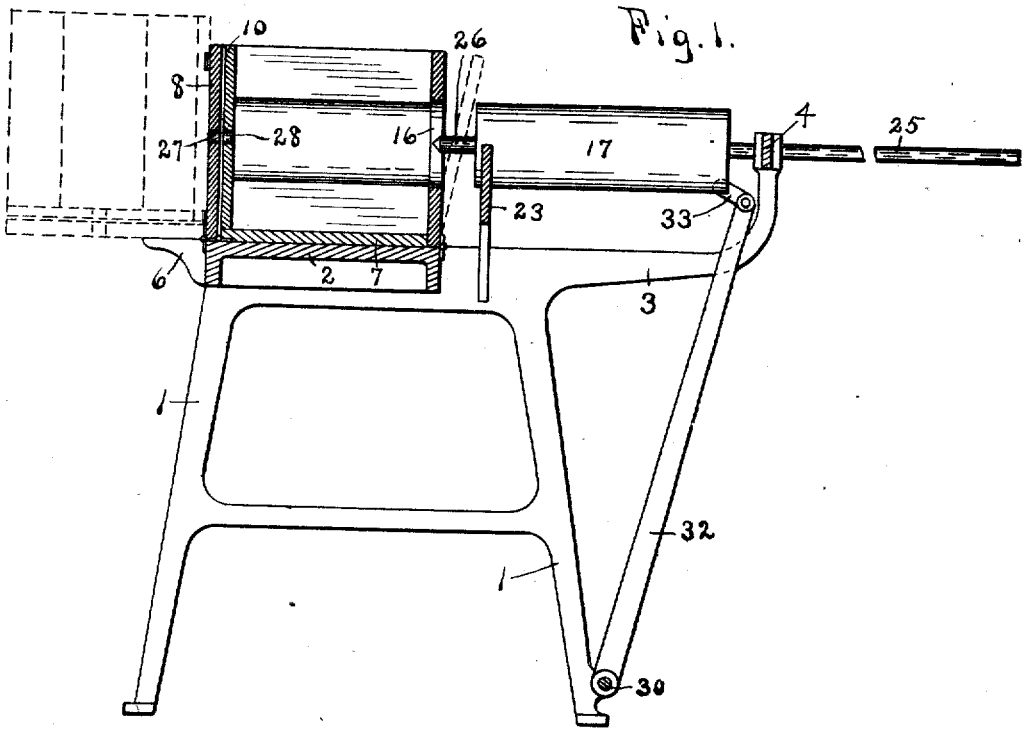
Figure 2:
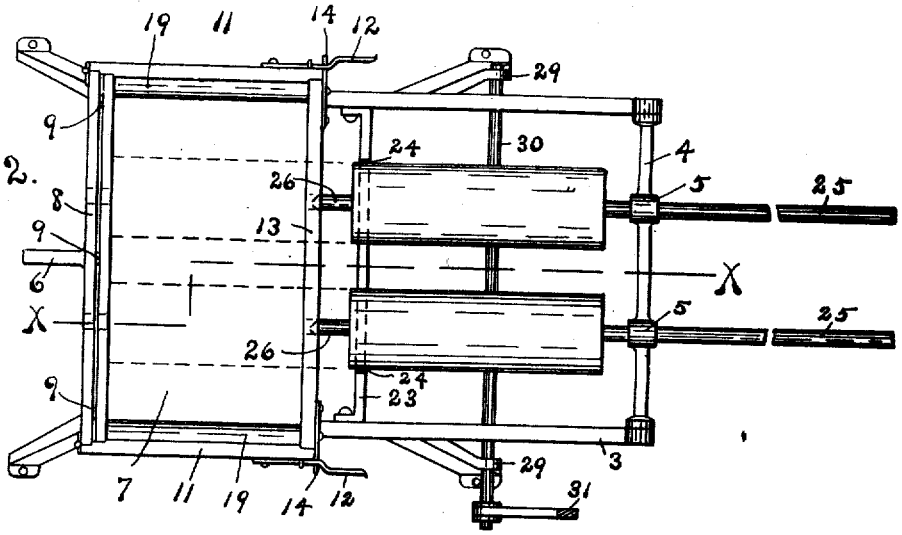
Figure 3:
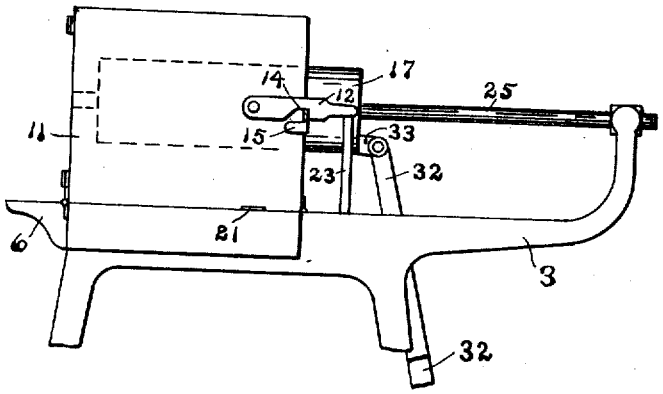
Figure 4:
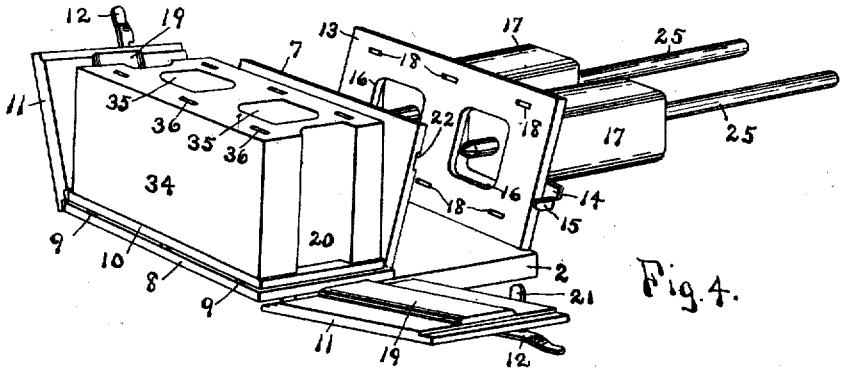

Figure 1 is a view of our invention in vertical section, taken on the line $x\ x$ of Fig. 2 and showing in dotted outline the pivotal mold thrown back into position for removing the completed block therefrom. Fig. 2 is a plan view of the machine with the movable cores withdrawn from the mold and also shown in dotted outline in position in the mold, the operating-lever being broken away in part. Fig. 3 is an end of the machine with the supporting-frame broken away, showing the cores in position in the mold and the manner of securing the hinged sections together. Fig. 4 is a perspective view of our invention with the hinged sections of the mold thrown open, the cores withdrawn, and a completed building-block in position thereon ready for removal and the supporting-frame omitted.

The support of the operating mechanism consists of an upright frame, preferably of metal and having four legs 1, a rigid top 2, and a pair of rigid rearwardly-extending horizontal arms 3 in parallel relation, having their outer ends upturned and rigidly connected by the cross piece or bar 4, laterally apertured at 5 for the guide-rods of the movable cores hereinafter described. The top 2 has a fixed bracket 6 on its front face approximately midway its ends, Figs. 1 and 2, to support the mold when thrown forward.

The mold consists of a bottom plate 7, hinged to a side plate 8, having upon its upper face a plurality of transverse strips 9, Figs. 2 and 4, upon which is loosely arranged a plate 10 and to the front edge of which are hinged a pair of plates 11, Fig. 4, which are provided upon their rear edge with a latch 12, and a plate 13, hinged at its lower edge to the said top 2, having upon its outer face near its opposite ends a proper catch 14 to form a holding engagement with the said latch 12 and provided with forwardly-projecting lugs 15, adapted to overlap and engage the adjacent edge of the end plates 11 when the mold is closed. The plate 13 has a pair of lateral openings 16, adapted to snugly admit the longitudinally and horizontally movable cores 17 in the manner about to be described and is also provided upon its inner face with a plurality of recesses 18. The end plates 11 have upon their inner face a raised portion 19 to form a recess 20 at each end of the blocks, although for molding corner-blocks an end plate 11 is employed, in which the raised portion 19 is omitted. To the lower edge of the end plates 11 and near their rear end is fixed a metal lug 21, adapted to fit within a corresponding recess 22 in the lower face of the bottom plate 7, thereby securing these plates in a holding engagement until the end plates 11 are disengaged by opening them outwardly, as shown in Fig. 4.

At suitable points on the supporting-frame are rigidly fixed the pendent ends of the cross-bar 23, provided upon its upper edge with proper recesses 24 to loosely receive, support, and guide the cores 17. These cores, two in number and identical in construction, are mounted in the said recesses 24, have upon their rear end a fixed guiding-stem 25, loosely mounted in the said lateral openings in the cross-bar 4, and are provided upon their forward end with a short stem or projecting lug 26, adapted to enter the registering openings 27 and 28 in the adjacent plates 8 and 10, respectively, when the cores are in position within the mold.

At any suitable points upon the rear legs 1 of the supporting-frame are provided apertured lugs 29, in which is rotatively mounted the horizontal shaft 30, having upon one extended end thereof a fixed upwardly-extending hand-lever 31 of proper form and dimensions.

At suitable points on the shaft 30 are rigidly fixed the lower ends of the actuating-levers 32, which are pivotally connected to the rear ends of the respective cores 17 by means of the short links 33, Fig. 1.

The operation and manner of employing our invention thus described are briefly stated as follows: The mold is first firmly closed and secured by means of the latches 12 and lugs 21, the cores 17 being withdrawn, as shown in Figs. 1 and 2. The operator now fills the mold up to the bottom of the openings 16 in the side plate 13 with the desired material to form the front face of the block, which is generally made with finer and more expensive material and which may be colored, if desired. While forming this portion of the block the openings 16 may be closed in any proper manner, as by a thin metal plate suspended by a flange from the upper edge of the side 13 or otherwise, after which it is removed and the cores 17 are moved forward simultaneously into their position within the mold, as described, by a forward movement of the hand-lever 31. When the cores are in this position within the mold, their rear ends are firmly supported by the respective pins or lugs 26, which rest within the openings 27 and 28. The operator now fills up the mold with cement, preferably of a coarser grade than that which was first placed therein to form the front face of the block, as above described, packs it down in a proper manner, and then removes all surplus cement by scraping it off even with the top edge of the mold. To remove the completed block thus formed from our improved machine, the operator first withdraws the cores 17 from the mold into the position shown in Fig. 1, then disengages the latches 12, and then tips block 34 forward with the remaining portion of the mold, as shown in dotted lines in Fig. 1 and in full lines in Fig. 4, being supported in such position by the bracket 6, after which the ends 11 are thrown back on their hinges and the bottom plate 7 is tilted rearward on its hinges. This leaves the completed block 34 resting upon its bottom face upon the removable plate 10, which in practice is removed with the block to its place of deposit. The block 34 thus formed has the openings 35 for the well-known ventilating and sanitary purposes for which hollow building-blocks are designed, has the end recesses 20, which will of course register with the corresponding end recess of the next adjacent block when laid in a wall, and has a series of small lugs or beads 36 upon its upper face to permit a proper layer of mortar between the blocks in the wall and also to aid in protecting the corners of the blocks in handling and laying them into the wall.

When it is desired to form corner-blocks with our machine, a hinged plate 11, having plane inner face, instead of the one shown, is substituted.

Having now described our invention and the manner of operating the same, what we desire to secure by Letters Patent is—

1. A hollow-building-block machine consisting of a supporting-frame having a table for the hinged mold, and rearwardly-extending arms for the core-guides; a mold consisting of a rear side plate hinged to the rear edge of said table and having a pair of lateral core-openings, a forward side plate hinged to the forward edge of said table, having a bottom plate hinged to its lower edge, and having end plates hinged to its opposite ends, as shown, and a removable plate arranged adjacent to the inner face of the said forward side plate; a pair of movable cores adapted to enter the mold through the said lateral openings therein; and means for moving said cores into and out of the mold.

2. In an apparatus of the class described, a supporting-frame having a table upon its front edge and extended arms upon its rear edge for the core-guides; a knockdown mold whose opposite sides are hinged to said table, and whose outer side has bottom and end sections hinged to its lower edge and ends respectively; means for securing these hinged sections together; a plurality of movable cores adapted to be adjusted into and out of the mold through suitable openings in the said rear side plate; and means for operating said cores.

3. In a hollow-building-block machine, a knockdown mold formed of hinged sections and consisting of a rear side plate hinged to a fixed base or support and provided with lateral openings for the horizontally-movable cores; a front side plate or section hinged at its lower edge to said base; a base-plate hinged to the lower edge of said front side plate, end plates or sections hinged to the front side plate, a removable plate arranged adjacent to the inner face of said front side plate; and means for rigidly securing the said hinged sections together.

4. In a building-block machine, the combination of a frame, a longitudinally-movable core carried thereby; a mold supported by said frame comprising a rear side plate provided with aperture for the core, a front side plate, end plates and a base-plate, said end plates, front side plate, and base-plate adapted to be swung forward as a unit until arrested by the frame.

5. In a building-block machine, the combination of a frame, a longitudinally-movable core carried thereby; and a mold supported by said frame comprising a rear side plate provided with an aperture for the core, a front side plate hinged to said frame, end plates, and a base-plate hinged to the front side plate, said end plates, front side plate and base-plate adapted to be swung forward as a unit until arrested by the frame.

6. In a building-block machine, the combination of a frame, a longitudinally-movable core carried thereby, a mold supported by said frame comprising a back plate provided with an aperture for the core, end plates, a front side plate and a bottom plate, said bottom plate adapted to be swung up to vertical position and said front side plate to horizontal position to carry the molded block to discharging position.

7. In a building-block machine, the combination of a pivotally-mounted mold formed of hinged sections, a horizontally-movable core for forming the hollow interior of the blocks, a supporting-frame on which the mold and core are mounted, and means for moving said core into and out of the mold, part of said mold being adapted to swing outward to discharge the molded block.

8. A building-block machine consisting of a supporting-frame having a table for a hinged mold, a mold consisting of a rear side plate hinged to the rear edge of said table, a forward side plate hinged to the forward edge of said table and having a bottom plate hinged to its lower edge, and having end plates hinged to its opposite ends as shown, and a removable plate arranged adjacent to the inner face of the said forward side plate.

9. In an apparatus of the class described, the combination of a supporting-frame, a table, a knockdown mold whose opposite sides are hinged to said table and whose outer side has bottom and end sections hinged to its lower edge and ends respectively, and means for securing these hinged sections together.

10. In a building-block machine, a knockdown mold formed of hinged sections and consisting of a rear side plate, a base or support for the same, a front side plate or section hinged at its lower edge to said base, a base-plate hinged to the lower edge of said front side plate, end plates or sections hinged to the front side plate, a removable plate arranged adjacent to the inner face of the front side plate, and means for rigidly securing the said hinged sections together.

11. In a building-block machine, the combination of a frame, a mold supported by said frame consisting of a rear side plate, a front side plate, end plates and a base-plate, said end plates, front side plate and base-plate adapted to be swung forward as a unit away from the back plate until arrested by the frame.

12. In a building-block machine, the combination of a frame, a mold-box composed of a front section, a removable carrier-plate adjacent thereto and normally forming one of the side walls of the mold, a bottom section connected to the front section, a rear section, and hinged end sections; the front section being adapted to turn with the carrier-plate to horizontal position, and the bottom section being simultaneously carried to an upright position.

13. In a building-block machine, the combination of a frame, and a mold supported by said frame comprising a back plate independently connected to the frame, end plates, a front side plate connected to the frame and a bottom plate, said bottom plate adapted to be swung up to vertical position and said front side plate to horizontal position to carry the molded block to discharging position away from the back plate.

14. In a machine for the formation of hollow blocks from plastic material, the combination of a frame, a mold-box including a removable carrier-plate normally forming one of the side walls of the box, bottom and end plates all mounted for bodily movement to turn the carrier-plate to an approximately horizontal position with the block resting thereon, the end plates being movable to free the block from the mold and means hinged to said frame adapted to support said removable carrier-plate, the other side plate being stationary.

In testimony whereof we have each of us signed our name to this application in the presence of two subscribing witnesses.

FRANK A. BORST.
JOHN GROSCOP.

Witnesses:
J. E. POMEROY
J. J. VAN AUKEN.

DISCLAIMER.

12578. (Reissue.)—*Frank A. Borst*, South Bend, and *John Groscop*, Auburn, Ind. MACHINE FOR MANUFACTURING HOLLOW CONCRETE BUILDING-BLOCKS. Patent dated December 18, 1906. Disclaimer filed October 10, 1913, by the assignee, *Ideal Concrete Machinery Company*.

Enters this disclaimer—

"To that part of the claims in said specification which is in the following words, to wit:

"4. In a building-block machine, the combination of a frame, a longitudinally-movable core carried thereby; a mold supported by said frame comprising a rear side plate provided with aperture for the core, a front side plate, end plates and a base-plate, said end plates, front side plate, and base-plate adapted to be swung forward as a unit until arrested by the frame.

"5. In a building-block machine, the combination of a frame, a longitudinally-movable core carried thereby; and a mold supported by said frame comprising a rear side plate provided with an aperture for the core, a front side plate hinged to said frame, end plates, and a base-plate hinged to the front side plate, said end plates, front side plate and base-plate adapted to be swung forward as a unit until arrested by the frame.

"6. In a building-block machine, the combination of a frame, a longitudinally-movable core carried thereby, a mold supported by said frame comprising a back plate provided with an aperture for the core, end plates, a front side plate and a bottom plate, said bottom plate adapted to be swung up to vertical position and said front side plate to horizontal position to carry the molded block to discharging position.

"7. In a building-block machine, the combination of a pivotally-mounted mold formed of hinged sections, a horizontally-movable core for forming the hollow interior of the blocks, a supporting-frame on which the mold and core are mounted, and means for moving said core into and out of the mold, part of said mold being adapted to swing outward to discharge the molded block.

"8. A building-block machine consisting of a supporting-frame having a table for a hinged mold, a mold consisting of a rear side plate hinged to the rear edge of said table, a forward side plate hinged to the forward edge of said table and having a bottom plate hinged to its lower edge, and having end plates hinged to its opposite ends as shown, and a removable plate arranged adjacent to the inner face of the said forward side plate.

"9. In an apparatus of the class described, the combination of a supporting-frame, a table, a knockdown mold whose opposite sides are hinged to said table and whose outer side has bottom and end sections hinged to its lower edge and ends respectively, and means for securing these hinged sections together.

"10. In a building-block machine, a knockdown mold formed of hinged sections and consisting of a rear side plate, a base or support for the same, a front side plate or section hinged at its lower edge to said base, a base-plate hinged to the lower edge of said front side plate, end plates or sections hinged to the front side plate, a removable plate arranged adjacent to the inner face of the front side plate, and means for rigidly securing the said hinged sections together.

"11. In a building-block machine, the combination of a frame, a mold supported by said frame consisting of a rear side plate, a front side plate, end plates and a base-plate, said end plates, front side plate and base-plate adapted to be swung forward as a unit away from the back plate until arrested by the frame.

"12. In a building-block machine, the combination of a frame, a mold-box composed of a front section, a removable carrier-plate adjacent thereto and normally forming one of the side walls of the mold, a bottom section connected to the front section, a rear section, and hinged end sections; the front section being adapted to turn with the carrier-plate to horizontal position, and the bottom section being simultaneously carried to an upright position.

"13. In a building-block machine, the combination of a frame, and a mold supported by said frame comprising a back plate independently connected to the frame, end plates, a front side plate connected to the frame and a bottom plate, said bottom plate adapted to be swung up to vertical position and said front side plate to horizontal position to carry the molded block to discharging position away from the back plate.

"14. In a machine for the formation of hollow blocks from plastic material, the combination of a frame, a mold-box including a removable carrier-plate normally forming one of the side walls of the box, bottom and end plates all mounted for bodily movement to turn the carrier-plate to an approximately horizontal position with the block resting thereon, the end plates being movable to free the block from the mold and means hinged to said frame adapted to support said removable carrier-plate, the other side plate being stationary."

[OFFICIAL GAZETTE, *October 21, 1913*.]